P. N. JONES & J. W. WELSH.
CONTROL OF ELECTRIC MOTORS AND APPARATUS THEREFOR.
APPLICATION FILED JULY 17, 1915.
1,264,941.
Patented May 7, 1918.
4 SHEETS—SHEET 1.
Fig. 1.
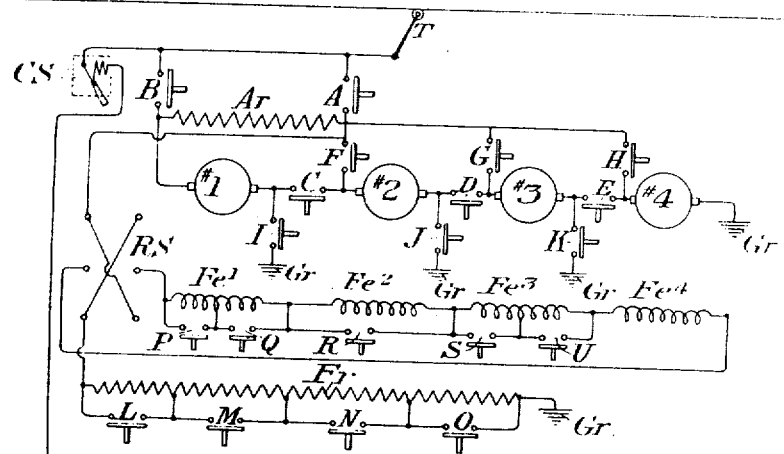
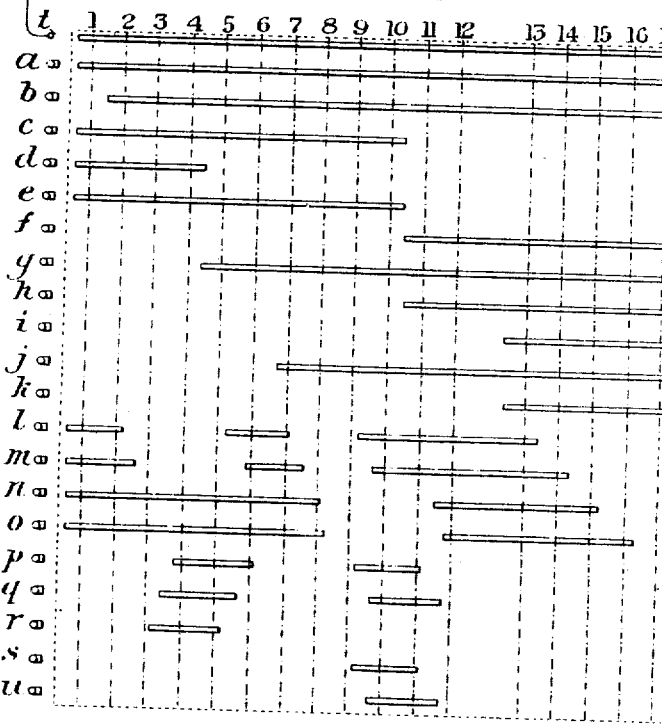

UNITED STATES PATENT OFFICE.

PEARL N. JONES, OF PITTSBURGH, AND JAMES W. WELSH, OF OAKMONT, PENNSYLVANIA.

CONTROL OF ELECTRIC MOTORS AND APPARATUS THEREFOR.

1,264,941.  Specification of Letters Patent.  Patented May 7, 1918.

Application filed July 17, 1915. Serial No. 40,441.

*To all whom it may concern:*

Be it known that we, PEARL N. JONES and JAMES W. WELSH, both citizens of the United States, and residents of Pittsburgh and Oakmont, respectively, Allegheny county, Pennsylvania, have invented a new and useful Improvement in Control of Electric Motors and Apparatus Therefor, of which the following is a full, clear, and exact description, reference being had to the accompanying drawings, forming part of this specification, in which—

Figure 1 is a diagrammatic view showing a plurality of motors, their circuit connections and circuit controlling switches, together with a development of one form of master controller for controlling such switches.

Our invention has relation to the control of electric motors, and is especially applicable for use in connection with the motors of electrically propelled vehicles.

The invention, considered as a whole, is particularly adapted to the control of a plurality of electric motors having separately excited field windings. By "separately excited" as used herein and in the appended claims, we refer to field windings which are in shunt, or which are excited by circuit connections which are independent of the armature circuits, although the current for both the armature and field windings may be derived from the same source.

The invention may be used either with motors in which all the field windings are separately excited, or the field windings may be compound wound, their main windings being separately excited, with secondary windings which are in series with the armature windings.

One object of our invention is, to provide a novel method of and means for accelerating a plurality of electric motors by a series of gradual and easy transitions, and with the use of a minimum amount of external resistance, particularly in the armature circuits, the motors being shifted from series to series-parallel relation, and thence to full-parallel relation, mainly by changes in the field strength of the motors.

A further object of the invention is to provide an efficient and economical method of and apparatus for the control of a plurality of motors whereby the motors may be operated regeneratively. That is to say, in which, in coasting down a grade, or in bringing the car to a stop, the motors may be made to act as generators and to return the generated current back into the supply line.

Our invention will be best understood by reference to the accompanying drawings in which several modifications are illustrated, and which will now be described, it being premised, however, that the method of control, particularly as to its minor steps, may be considerably varied, and that other forms of apparatus having the general principles and features of operation of those herein described may be used, without departing from the spirit and scope of the invention as defined in the appended claims.

Figure 2:
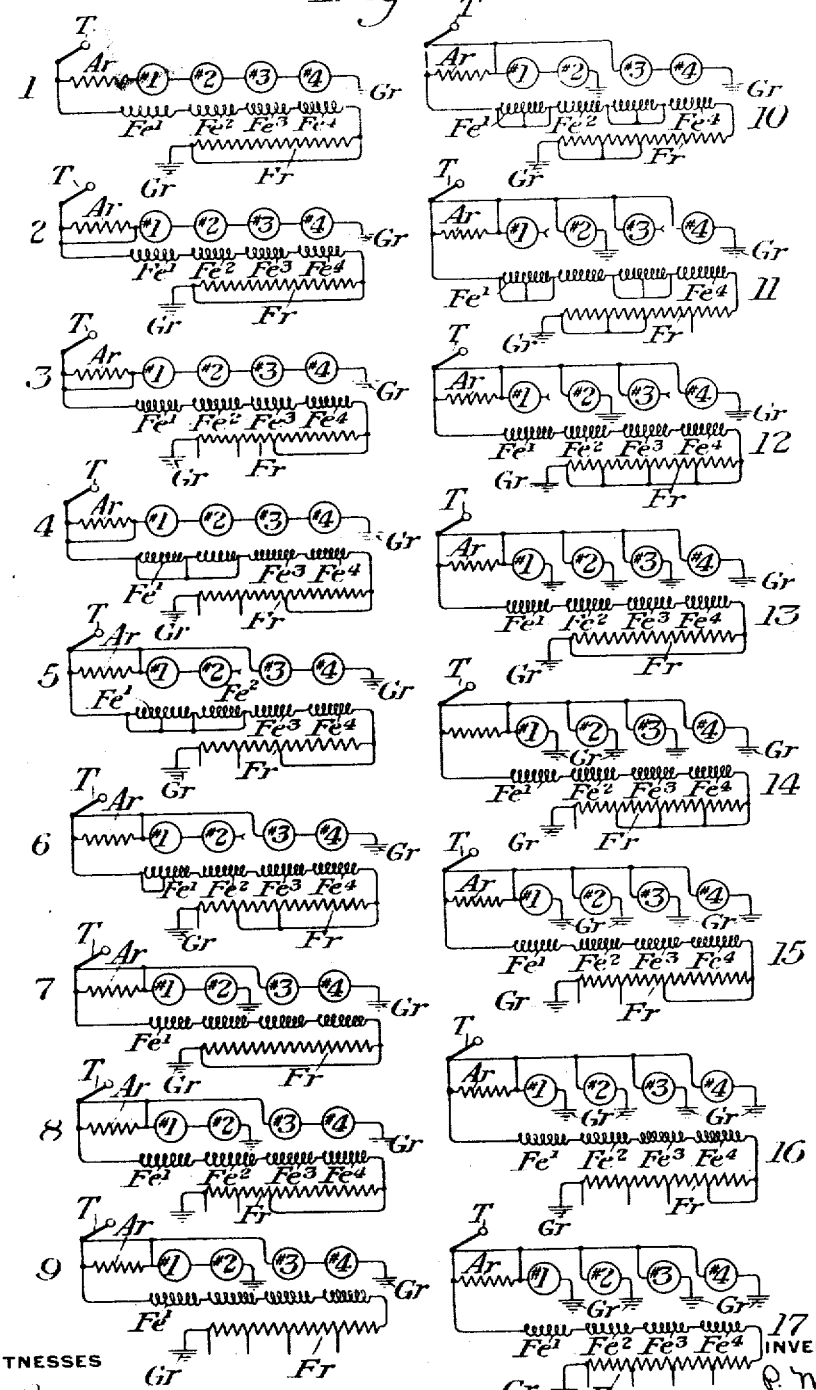
Fig. 2 is a diagram showing graphically the seventeen different motor connections and relations in the seventeen different positions of the master controller.

Referring first to that form of our invention illustrated in Figs. 1 and 2, #1, #2, #3 and #4 designate respectively the armatures of four electric motors. For the purposes of this invention we prefer to employ the type of motors known as interpole motors in which the effect of cross-magnetization is reduced to a minimum. $Fe^1$, $Fe^2$, $Fe^3$ and $Fe^4$ designate, respectively, the separately excited field windings of these motors, and which windings we prefer to keep permanently connected in series with each other. $Ar$ designates external resistance which can be connected in the armature circuit. $Fr$ designates sectional external resistance connected in series with the separately excited field windings. T designates the connection with the supply side of the circuit. $Gr$, wherever seen, designates a return or ground connection. A and B are switch devices for connecting the armature circuits with the supply side of the line. C, D and E are other switch devices for controlling the series connection between the armature windings of the four motors. I, J and K are switch devices for grounding the armature windings of motors #1, #2 and #3, motor #4 being shown as having a permanent ground connection. P, Q, R, S and U are switch devices whereby the field windings or portions thereof may be short-circuited.

MC designates a master controller, shown in the usual developed form, and which is for controlling the actuators of the various switches just referred to. The contact fingers $a$, $b$, $c$, etc., shown in Fig. 1 are connected, respectively, with the actuators of the various switches A, B, C, etc., finger $a$ being connected to the actuator of switch A, finger $b$ to the actuator of switch B, and finger $c$ to the actuator of switch C, etc. To simplify the drawings, these connections, together with the actuators, have been omitted, since we may use any suitable actuators known in the art, such, for instance, as those shown in our Patent No. 1,109,338, dated September 1, 1914. It will be readily understood by those familiar with the art, that when one of the fingers $a$, $b$, $c$, etc., is in engagement with the contact shown opposite to such finger on the drum MC, the corresponding actuator will be energized and its switch closed, while at all other times that particular switch will be open. The several positions or "notches" of the controller are indicated by the broken vertical lines 1 to 17 of Fig. 1; and the circuit conditions corresponding to these several positions are shown in the series of diagrams of Fig. 2, these diagrams being numbered to agree with the numbering of the positions or notches indicated in Fig. 1.

RS designates a field reversing switch of any well known type. CS designates the usual platform switch or circuit breaker.

In accelerating the motors, when the master controller is moved to its first position, switches A, C, D, E, L, M, N and O are closed, thereby connecting the armatures of the four motors in series with each other and with the resistance A$r$, the field windings of the four motors being also connected in series with each other, but in parallel with the armatures, and the resistance F$r$ is short-circuited by means of the switches L, M, N and O.

At the second position, the only change is to energize the switch B, thereby short-circuiting the resistance A$r$.

At position 3, switches L and M are opened successively, thereby throwing a portion of the resistance F$r$ into series with the field windings and to this extent weakening the strength of the fields collectively.

On the forth position, switches P, Q and R are energized (the switches otherwise remaining as in position No. 3). The closing of switches P, Q and R short-circuits the field windings of motors #1 and #2, this being done in three steps in passing from position 3 to position 4. The first step consists in short-circuiting the field of motor #2, followed by the short-circuiting of half of the field of motor #1, and finally by the remaining half of motor #1.

At the fifth position, switch G is closed and switch D opened. The effect of this is first to short-circuit and then to open-circuit the armatures of #1 and #2 motors and to connect the armatures of #3 and #4 motors in series across the line.

In the sixth position, the field of #1 and #2 motors are again reëstablished by two steps. The first step consists in opening the short-circuit on field F$e^2$ by the opening of the switch R, and substantially simultaneously therewith short-circuiting a portion of the resistance F$r$ by the closing of the switch L. The short-circuit on one half of field F$e^1$ is then opened by the opening of switch Q. More of the resistance F$r$ is then short-circuited by the closing of the switch M.

In passing to the seventh position, the opening of the switch P opens the short-circuit of the remaining half of field F$e^1$, and #1 and #2 armatures are then connected directly across the line in series-parallel with armatures #3 and #4, with the full field strength, all of the resistance F$r$ being short-circuited. The connection of the #1 and #2 armatures across the line is effected by the closing of the switch J; switches P, Q, R, S and U are open, and switches L, M, N and O are closed. The short-circuits of all the field windings are thus opened, and all the resistance F$r$ is short-circuited.

At the eighth position a portion of the external field resistance F$r$ is cut in in two steps by the successive opening of the switches L and M.

At the ninth position the remainder of the field resistance has been cut in by the successive opening of the switches N and O.

At the tenth position the fields of #1 and #3 armatures are short-circuited, this condition being reached by first short-circuiting half the fields of #1 and #3 and at the same time short-circuiting a portion of the external field resistance, and next by short-circuiting the remaining halves of F$e^1$ and F$e^3$, and at the same time short-circuiting additional portions of the external field resistance. The two-step short-circuiting of the fields is effected by the closing of switches P and Q, S and U. The short-circuiting of additional portions of the field resistance is effected by the successive closing of switches L and M.

At the eleventh position the armatures #1 and #3 are first short-circuited and then open-circuited, and armatures #2 and #4 are connected directly across the line in parallel with each other by the closing of switches F and H and the opening of switches C and E.

At the twelfth position the fields $Fe^1$ and $Fe^3$ are reëstablished. This is effected by first opening the short-circuit on one-half of each of these fields by opening the switches P and S. At the same time a portion of the resistance $Fr$ is short-circuited by closing the switch N. The short-circuit on the remaining half of $Fe^1$ and $Fe^3$ is then opened by opening the switches Q and U, and short-circuiting the remaining portion of the resistance $Fr$ by closing the switch O.

At the thirteenth position the closing of switches I and K connects the #1 and #3 armatures directly across the line in parallel with each other and in parallel with the armatures #2 and #4. All four armatures are now in parallel and all of the external resistance $Fr$ is short-circuited.

At the fourteenth position a portion of the resistance $Fr$ is cut into circuit by the opening of the switch L; and on the fifteenth, sixteenth and seventeenth notches, additional portions of this resistance are put in circuit by the successive opening of the switches M, N and O, until, at the seventeenth position, all the external resistance is inserted.

It will be noted that after the armature resistance $Ar$ has been short-circuited by the closing of switch B in passing from the first to the second position, it remains short-circuited throughout all the successive positions; and that the changes in passing from series to series-parallel and from series-parallel to full-parallel, are effected wholly by variation in the strength of the individual fields and by changes in the external field resistance.

It will be noted that the first step preparatory to passing from series to series-parallel is to increase the speed of all the motors by cutting into circuit a portion of the resistance $Fr$ and thereby weakening the fields of the motors. The field windings of #1 and #2 are then short-circuited, throwing a higher voltage upon #3 and #4. Armatures #1 and #2 are then connected in series-parallel with armatures #3 and #4 with their individual fields reëstablished and the fields of all the motors strengthened by the removal of the external resistance.

In passing from series-parallel to parallel, substantially the same changes take place. The motors are first accelerated while in series-parallel relation by cutting in external resistance to weaken their fields. The fields of two of the motors are next partially and then wholly short-circuited, while the two remaining fields are strengthened both by the short-circuiting of some external resistance, as well as by the short-circuiting of the other two fields. Of course, the short-circuiting of some of the fields greatly strengthens the remaining fields. Two of the motors are then connected directly across the line and having strong fields, and the fields of the other two motors are reëstablished with all external resistance short-circuited and the motors are then connected in parallel, the fields of all four motors being strong. The fields are then weakened collectively by cutting in successive portions of the external resistance, and thus further accelerated.

It will be readily seen that the provision of the separately excited fields and the connections of the motors at the different positions readily permits of regenerative operation at any position of the controller. Whenever the speed of the car exceeds the speed corresponding to the normal motor speed at that position of the controller, the counter-electromotive force developed by the motors will be higher than the line voltage, and current will be fed back into the line. For example, this will occur when the car is running at the speed corresponding to the weakened separately excited fields, and these fields are then strengthened by cutting out the external resistance. The increase in field strength in this way makes the counter-electromotive force of the motors higher than the line voltage and results in regenerative operation. The same result is accomplished when the four motors operating at the speed and field strength corresponding to the full-parallel position with the strongest field are cut back into the series-parallel position in which two motors are in series across the line, thereby permitting the sum of the counter-electromotive forces of these two motors to feed current back into the line against the line voltage. This process is, however, effected gradually, as will be noted, since in changing from the full-parallel to the series-parallel position, the fields are first gradually strengthened collectively; the fields of two of the motors are short-circuited in two steps, and the external field resistance is cut back into the circuit to maintain a constant field current in the remaining motors. Then when the field is reëstablished on the first two motors, the external field resistance is again cut in, so that when the series-parallel position is reached, the motors are operating with a further weakened field.

The motorman may, therefore, by gradually notching back the controller in descending a grade, or in bringing the car to a stop, constantly maintain the car at a greater speed than the normal speed value of the controller position at any given time; and thus give a practically continuous regeneration.

Figure 3:
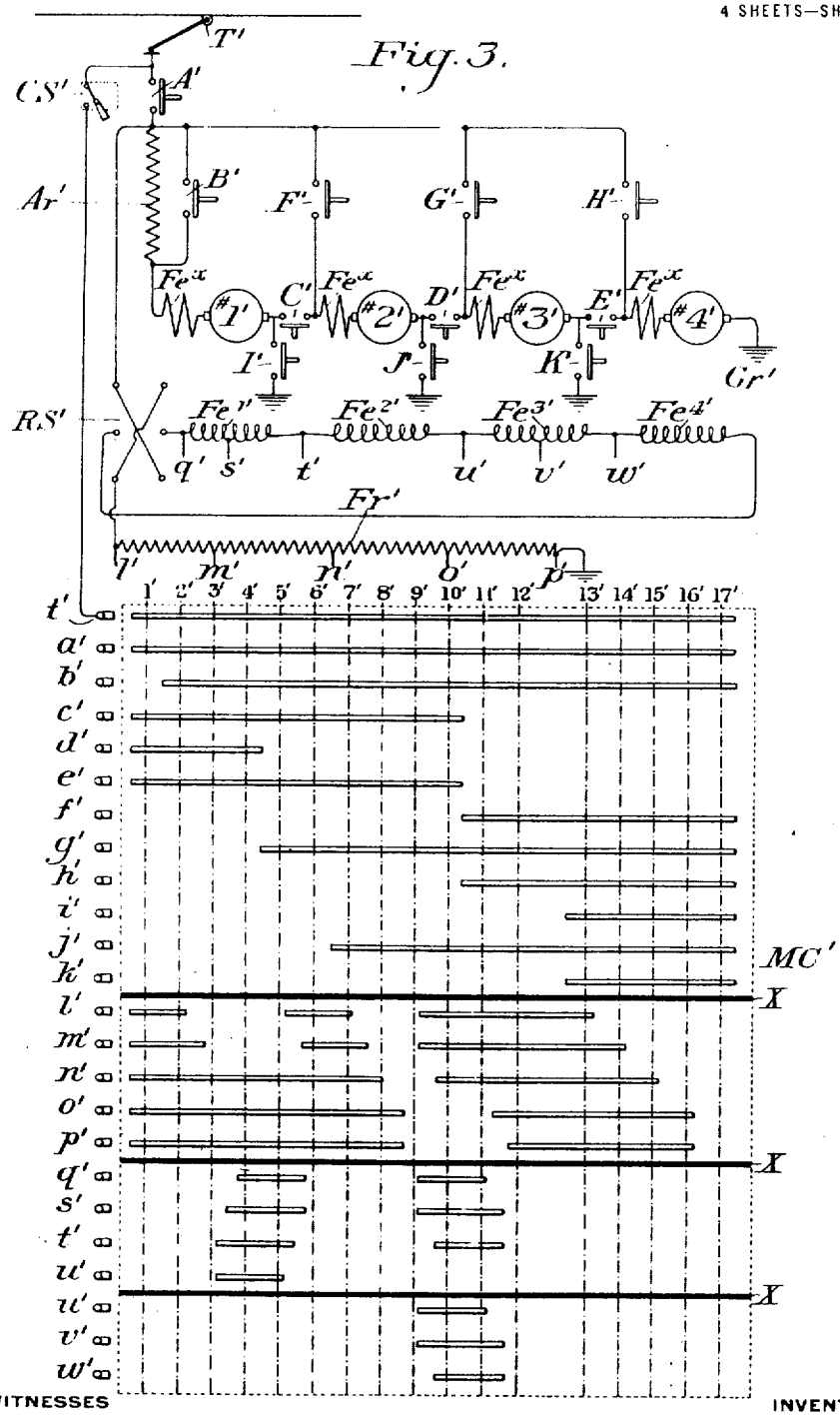
Fig. 3 is a view similar to Fig. 1, but showing a modification.

Fig. 3 shows a modification of our invention in which the only change, as compared with the form first described, consists in the use of an auxiliary field winding $Fe^x$ in series with each of the armatures and each of these windings being preferably maintained permanently in series with its armature. The same reference characters have been applied to Fig. 3 as to Fig. 2, with a prime mark added thereto. Substantially the only difference in the apparatus shown in Fig. 3 over that shown in Fig. 1 is that instead of employing the switches L, M, N, O, P, Q, R, S, U, and actuators therefor controlled by contacts on the master controller, the field coils and the resistance $Fr'$ are provided with the leads $l'$, $m'$, $n'$, $o'$, $p'$, $q'$, $s'$, $t'$, $u'$, $v'$ and $w'$, which are directly connected respectively to the similarly lettered contact fingers of the master controller MC'. This requires the provision of the additional contact fingers $t'$, $v'$ and $w'$, with the additional corresponding contacts indicated on the controller drum. Insulation X is also preferably provided on the drum at the points indicated in Fig. 3.

The purpose of the auxiliary series windings $Fe^x$ is to give the motors a drooping speed character, and has the advantage of improving the equalization of the load between motors having driving wheels of different diameters, or having inequalities in their field magnet circuits. These auxiliary series windings will also prevent any one motor from taking an excessive load when its separately excited field is weakened, since the increased current which is drawn from the line in this case will strengthen the field magnetization. This is of value when the load is exceptionally heavy or when heavy grades are encountered.

These auxiliary windings also form a further means of graduating the amount of regenerated current when operating the motors regeneratively. In this case the series windings oppose the magnetization produced by the separately excited windings and thereby act to reduce the counter-electromotive force when the regenerated current fed back into the line becomes excessive. In other words, the motors in this case act as differentially compound wound generators. For this reason they do not need an equalizer connection, or direct connection between their armature brushes. For example, if one motor does not regenerate as a result of poor magnetic circuit or of slower speed resulting from a different wheel diameter; and if the other motors acting as generators should feed into this motor, the effect would be to increase its field strength and thereby increase its counter-electromotive force and cause it to regenerate. On the other hand, a motor which tends to regenerate too much current will thereby automatically weaken its field and thus bring it back to the proper condition.

Figure 4:
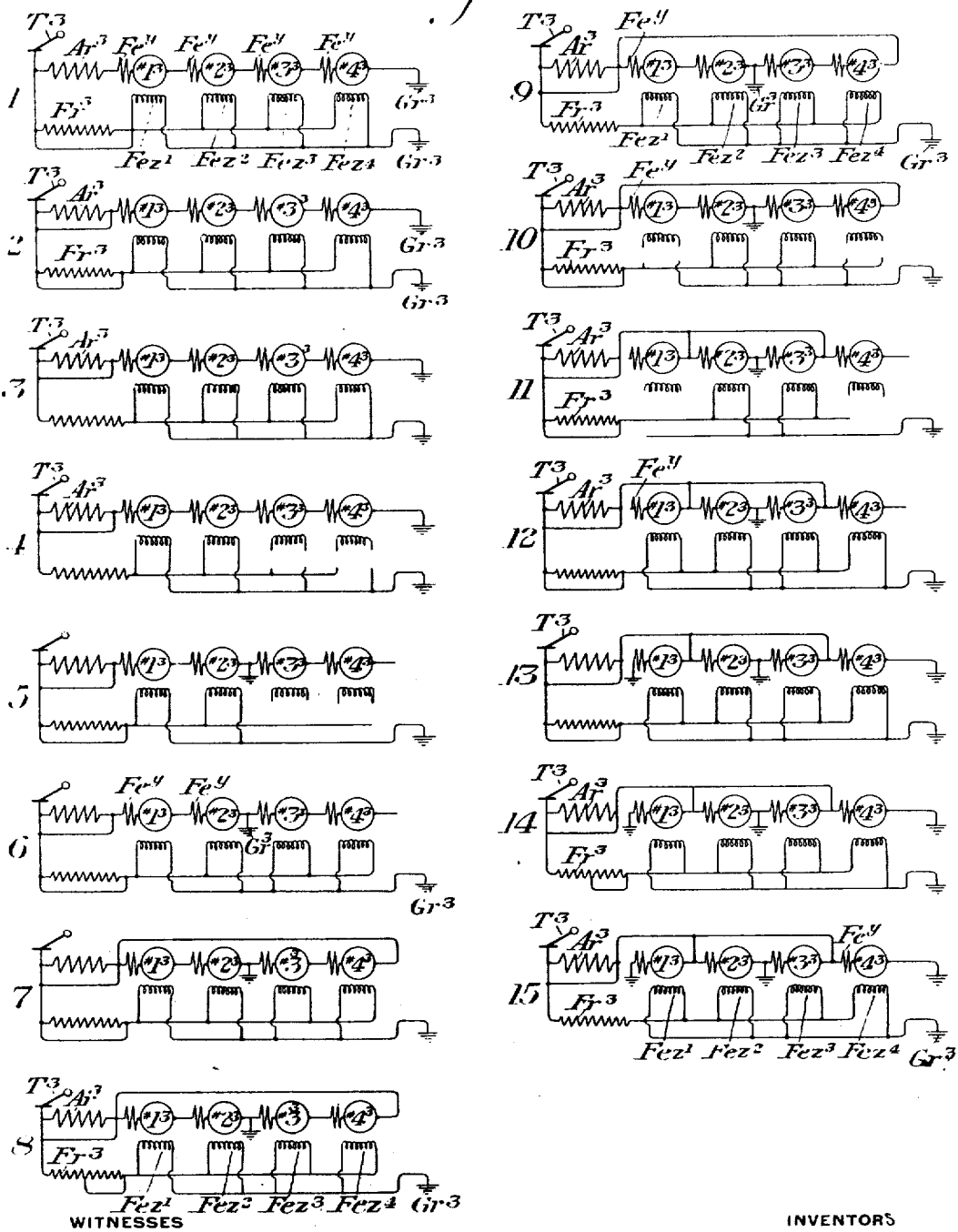
Fig. 4 is a view similar to Fig. 2, but showing a modification.

In Fig. 4 we have illustrated a modified system of control in which the separately excited fields, instead of being permanently connected in series across the line, are connected in parallel across the line. In this drawing, corresponding parts are given the same reference characters as in Fig. 2, with the numeral 3 applied thereto. The auxiliary field windings also used in this system, as in that shown in Fig. 3, are marked $Fe^y$, and the main shunt field windings are marked $Fes^1$, $Fes^2$, $Fes^3$, $Fes^4$.

It will be seen that in the first position the armatures with their auxiliary series windings are in straight series and with their fields all in parallel, the armature resistance being in circuit, but the field resistance, which is in series with the parallel main field windings, being short-circuited. In position 2 the armature resistance is short-circuited. In position 3 the short-circuit for the field resistance is removed. In position 4 the separately excited field windings of two of the motors are open-circuited. In position 5 the two armatures whose fields are thus open-circuited are cut out. In position 6 the two open-circuited fields are re-connected in a manner to reverse the direction of flow of the current therethrough preparatory to reconnecting the armatures of these motors as shown at position 7. At such position, it will be seen that the armatures are reconnected with the current flow therethrough reversed, and this makes it necessary to reverse the flow through the corresponding fields. In the eighth position, the connections are the same as in the seventh, except that a portion of the field resistance is put into circuit. In position 9 the entire field resistance is cut into circuit. At the tenth position, the field resistance is short-circuited and the fields of armatures #1 and #4 are open-circuited. At the eleventh position, armatures #1 and #4 are open-circuited. At the twelfth position, the fields of these two armatures are reconnected to cause reverse current flow therethrough; and at the thirteenth position the four armatures are connected in parallel across the line with the field resistance short-circuited. At the fourteenth position, a portion of this short-circuit is removed, and at position 15 it is entirely removed.

By the term "weakening" as used herein and in the claims, I intend to cover either the elimination of either a portion or the entire field winding of the motor or motors affected; and it will be seen that this may be accomplished either by short-circuiting or open-circuiting.

In those claims in which we have referred to closing the motor armatures in certain relations, we intend to include also the auxiliary series winding, which is permanently in series with the armatures in the forms where these auxiliary windings are used.

We claim:

1. In the control of electric motors having separately excited field windings, the method of acceleration which consists in first connecting the motor armatures in series across the line, then increasing their speed by weakening their field strength collectively, and also by further weakening the field strength of some of the motors individually, and then reconnecting the motor armatures into smaller groups across the line, while running them at the increased speed due to such weakening, and increasing their field strength substantially simultaneously with their reconnection, substantially as described.

2. The method of accelerating a plurality of electric motors having separately excited field windings, which comprises connecting their armatures in series across the line, then weakening the fields of all of the motors collectively, and then further weakening the field strength of some of them to increase the voltage on the others, and then reconnecting such armatures across the line in series-parallel with the remaining armatures, and increasing their field strength substantially simultaneously with their reconnection, substantially as described.

3. The method of accelerating a plurality of motors having separately excited field windings, which comprises connecting their armatures in series across the line, then weakening the fields of all of the motors collectively and also of some of them individually to increase the voltage on the others, then reconnecting such armatures across the line in series-parallel with the remaining armatures and substantially simultaneously therewith increasing their field strength, and then again weakening the fields of some of the motors, and finally connecting all the motors across the line in parallel, substantially as described.

4. In the control of a plurality of electric motors, having separately excited field windings, the method which consists in first connecting the motor armatures in series across the line, then weakening the fields of one group of motors and reconnecting them in series-parallel with another group, then weakening the fields of the motors in both groups, and then successively connecting different armatures in parallel across the line, substantially as described.

5. In the control of a plurality of electric motors having separately excited field windings, the method which consists in weakening the fields of one group of motors and then reconnecting their armatures in series-parallel with another group, then weakening the fields of the motors in both groups, then successively connecting different armatures in parallel across the line, and strengthening the fields of the reconnected armatures both when reconnecting them in series-parallel and when reconnecting them in full-parallel, substantially as described.

6. In the control of a plurality of electric motors having separately excited field windings, the method which consists in first connecting the motor armatures in series across the line, then weakening the fields of all the motors collectively, and further weakening the fields of some of the motors individually, and then reconnecting the motor armatures having the individually weakened fields in series-parallel with the other armatures which have strengthened individual fields, substantially as described.

7. In the control of a plurality of electric motors having separately excited field windings, the method which consists in first connecting the motor armatures in series across the line, then weakening the fields of all the motors collectively, and further weakening the fields of some of the motors individually, and then reconnecting the armatures having the individually weakened fields in series-parallel with the other armatures, with strengthened individual fields, and then weakening the field strength of the motors as a whole, substantially as described.

8. In the control of a plurality of electric motors having separately excited field windings, the method which consists in first connecting the motor armatures in series across the line, then weakening the fields of all the motors and also further weakening the individual fields of one group of motors, and reconnecting such armatures with reëstablished fields in series-parallel with another group, and then subsequently again weakening the fields of some of the motors and connecting all the motors across the line in parallel, substantially as described.

9. The method of regeneratively operating a plurality of electric motors having separatively excited fields, which consists in increasing the field strength of some of the motors and then changing their connection from parallel to series-parallel, and decreasing their field strength in reconnecting them, and after reconnection, again increasing their field strength, substantially as described.

10. The method of regeneratively operating a plurality of electric motors having separately excited fields, which consists in increasing the field strength of some of the motors and then changing their connection from parallel to series-parallel, and substantially simultaneously therewith decreasing their field strength, and subsequently connecting all the motors in series across the line and increasing their field strength, substantially as described.

11. The method of regeneratively operating a plurality of electric railway motors, having separately excited main field windings, and auxiliary windings in series with their armatures, which consists in increasing the field strength of some of the motors and then changing their connection from parallel to series-parallel, and decreasing their field strength in reconnecting them, and after reconnection, again increasing their field strength, substantially as described.

12. In the control of a plurality of electric motors having separately excited fields, the method of changing the motor armatures from series-parallel to parallel relations, which consists in weakening the fields of all of the motors collectively, and further weakening the fields of one group of motors, and connecting the armatures of another group across the line in parallel, and then connecting the armatures of the first group in parallel across the line and with reëstablished fields, substantially as described.

13. The combination of a plurality of electric motors having separately excited field windings and having external resistance in series with all of said windings, of switch devices and connections arranged to connect the motors in series, in series parallel and in full parallel, and also having means for affecting the field strength of all of the motors collectively by varying the amount of such external resistance in circuit therewith, and for further changing the field strength of the motors individually by short circuiting the field windings thereof; substantially as described.

14. The combination of a plurality of electric motors having separately excited field windings, of switch devices and connections arranged to connect the motors in series-parallel, and in full-parallel, together with means for varying the field strength of the motors individually, and other means for varying their field strength collectively, substantially as described.

15. The combination with a plurality of electric motors having separately excited field windings permanently connected in series, of switch devices and connections arranged to connect the motor armatures in series, in series-parallel and in full-parallel without changing the connections of the fields, together with means for varying the strength of said fields in a fixed sequence in connection with the circuit changes of the armatures, substantially as described.

16. The combination with a plurality of electric motors having separately excited main field windings, and auxiliary field windings permanently in series with their armatures, of switch devices and connections arranged to connect the motor armatures and their windings in series, in series-parallel and in full-parallel, together with means for changing the field strength of the main field windings both individually and collectively, substantially as described.

17. The combination with a plurality of motors having separately excited field windings permanently connected in series, of means for operating the motors regeneratively for reducing their speed, said means comprising switch devices and circuit connections constructed and arranged to change the motor armatures from parallel to series-parallel and then to series, together with means for varying the field strength of at least some of the motors in reconnecting them in their new relations, substantially as described.

18. The combination with a plurality of electric motors, and with external resistance for connection in series with the field windings of all of said motors, of switch means arranged to connect the external resistance, or portions thereof, in series with the field windings of all of the motors, and substantially simultaneously therewith to short-circuit some of the field windings, substantially as described.

In testimony whereof, we have hereunto set our hands.

PEARL N. JONES.
JAMES W. WELSH.

Witnesses:
Geo. K. McGunnegle,
T. W. Ernst.